2 Sheets--Sheet 1.
A. M. DE SOUCHET.
Improvement in Water-Meters.
No. 115,940. Patented June 13, 1871.
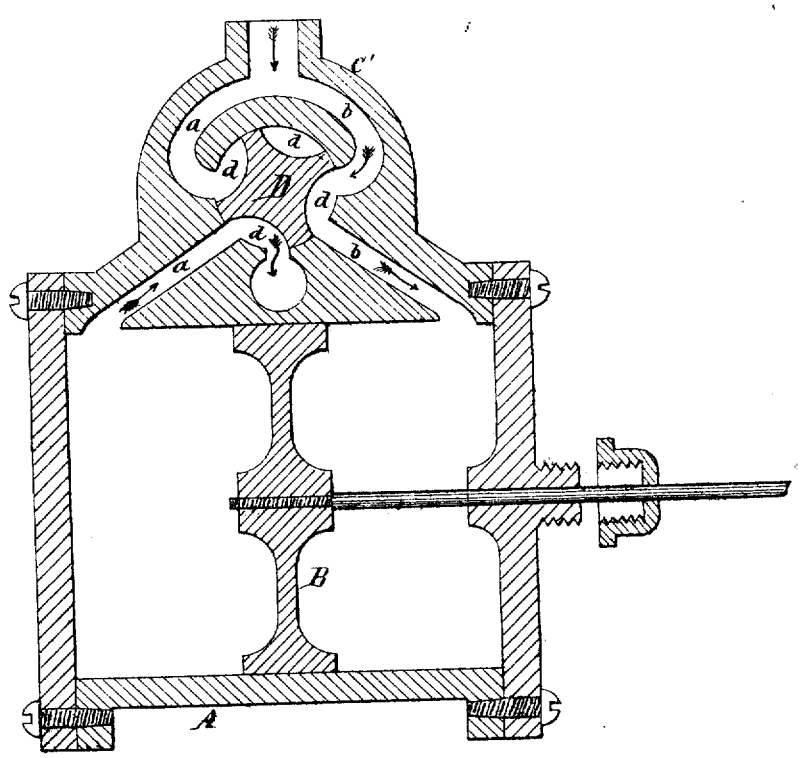
Fig. 1.
Fig. 2. Fig. 4. Fig. 3.
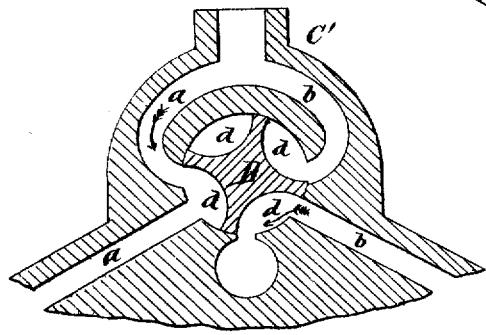
Witnesses.
Parker H. Sweet Jr
Chas. L. Coombs
Inventor:
A. M. De Souchet
by J. J. Coombs
Atty.

2 Sheets--Sheet 2.
A. M. DE'SOUCHET.
Improvement in Water-Meters.
No. 115,940.
Patented June 13, 1871.
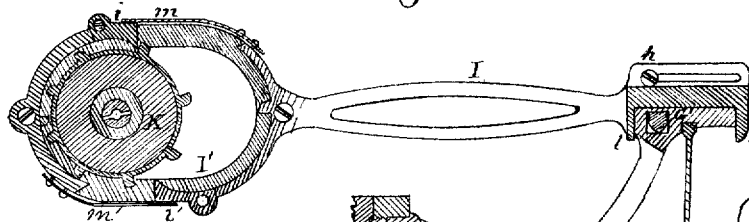
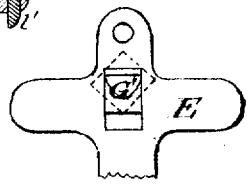
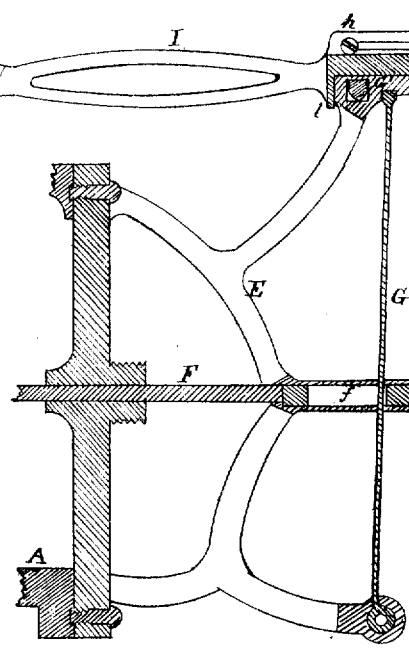
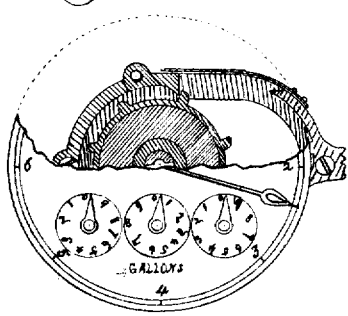
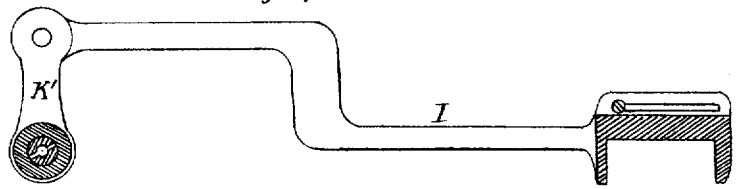
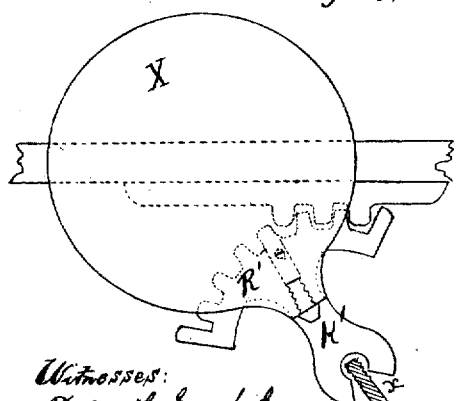
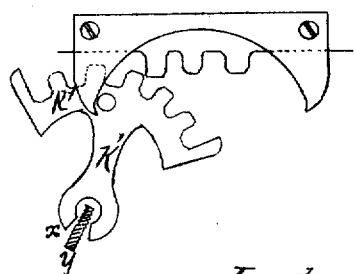
Witnesses:
Parker H. Sweet, Jr.
Chas. L. Coomes
Inventor:
A. M. De Souchet
by J. J. Coomes
Atty.
AM. PHOTO-LITHOGRAPHIC CO. N.Y. (OSBORNE'S PROCESS.)

UNITED STATES PATENT OFFICE.

AUGUSTUS M. DE SOUCHET, OF EVANSVILLE, INDIANA.

IMPROVEMENT IN WATER-METERS.

Specification forming part of Letters Patent No. 115,940, dated June 13, 1871.

*To all whom it may concern:*

Be it known that I, AUGUSTUS M. DE SOUCHET, of Evansville, in the county of Vanderburg and State of Indiana, have invented a new and useful Improvement in Water-Meters; and I do hereby declare that the following is a full, clear, and exact description thereof, reference being had to the annexed drawing making part of this specification.

My invention relates to that class of water-meters in which a cylinder with a reciprocating piston is used to measure the water, which is alternately admitted to and discharged at each end of the cylinder by means of a suitable valve, operated by mechanism receiving motion from the piston-rod, the said piston-rod also actuating the registering apparatus, whereby the quantity of water passing through the meter is marked. The nature of my invention consists in the employment of a rotating valve in connection with the cylinder, by means of which the water is admitted to and discharged from the cylinder, instead of the slide-valve ordinarily used, said valve being so constructed and arranged as to make a partial rotation at each stroke of the piston and form the proper connections with the induction and eduction ports of the cylinder; and my invention further consists in the use, in connection with said valve, of a peculiar valve-rod or pitman, operated by means of a spring bar or lever, so constructed and arranged as to yield to the force of the piston during the greater portion of its stroke and become released when the stroke is finished, and give the required motion to the valve to make the partial rotation or oscillation.

In the drawing, Figure 1 represents a sectional view of my apparatus through the cylinder and valve-box; Fig. 2, a longitudinal section through the valve-box and valve; Fig. 3, a transverse section of the valve-box and valve; Fig. 4, a front view of one end of the conical valve, showing the spring by which it is kept in place; Fig. 5, a detached view of the piston-rod, valve-rod, and spring-bar, which actuates it; and Fig. 6, a view of the registering apparatus. Fig. 7 shows a modification of the machinery by which the oscillating valve is actuated. Figs. 8 and 9 show other modifications, by which the same ends are accomplished; and Fig. 10 is a view of the adjustable stud.

A represents a cylinder of proper capacity, accurately bored, and fitted with a piston, B. Said cylinder is provided with induction and eduction ports $a$ $b$, similar to the ports in the cylinder of an ordinary reciprocating steam-engine, and a valve-box, C', as shown in Figs. 1 and 2. Longitudinally through the valve-box is bored a conical or tapering hole, into which is fitted the rotating valve D. The said valve consists of a conical or tapering plug of metal, glass, or other suitable material, turned or ground so as to accurately fit the hole through the valve-box. The said valve has four ports, $d$ $d$ $d$ $d$, so arranged that at each eighth rotation of the valve its ports will establish a communication between the valve-box and one end of the cylinder, and make a connection with the other end of said cylinder and the eduction or discharge pipe. Thus it will be seen that at each eighth rotation of the valve the water will be alternately admitted and discharged on opposite sides of the piston, thus giving it a reciprocating motion similar in action to the piston of an ordinary reciprocating steam-engine. To the smaller end of the valve D is attached a valve-stem, $d'$, which passes through an adjustable sleeve, $e$, having a screw-thread on its outer surface so as to engage a female screw cut in the valve-box. At the inner ends of the stem, next to the valve, is formed a beveled shoulder, $c'$, which fits in a conical recess or seat in the ends of the sleeve $e$, so that by screwing up the sleeve the valve can be tightened or loosened at pleasure. Against the larger end of the valve is placed a spring, $o$, the pressure of which is regulated by means of the set-screw $p$, said spring allowing the valve to yield whenever dirt or grit gets between the valve and its seat, so as to prevent the face of the valve from being injured. To one of the heads of the cylinder is attached a frame, E, of metal or other suitable material, and through this the piston-rod F passes. At the end of said piston-rod is a slot, $f$, through which a spring-bar or lever, G, passes, the lower end of said bar being hinged to the frame E, as shown, and the upper end resting against a stud, G', secured to the upper part of said frame. This stud G' is secured in a vertical slot in the frame E, so that it may be adjusted vertically, and release the spring G before the piston has completed its stroke for the purpose of operating the valve through the rod I, so as to regulate the amount of water passing through the meter. Above said stud the end of the valve-rod I is secured to the frame E by means of a screw, h, passing through a slot in the end of said rod, which allows a reciprocating motion to be given to said rod. In the lower edge of the end of said rod, and immediately under the slot, is cut a recess, leaving two jaws, l l', against which the upper end of the spring-bar G works. The said jaws fall over the stud G', as shown in Fig. 5. In said figure the piston is represented as on its return stroke, carrying the spring-bar or lever over until it reaches the stud G'. When in this position the said bar yields or bends until the upper end passes the stud G' and strikes against the jaw l, shoving the valve-rod forward so as to make one-eighth of a revolution. To the other end of said valve-rod is attached a yoke, I', which embraces a disk, K, secured to the shaft of the rotating valve, said disk being provided with eight projections or teeth arranged around its periphery. To the upper side of said yoke is hinged a pawl, i, forced inward by a spring, m, in such a manner that during the forward stroke of the piston and the corresponding movement of the valve-rod or pitman it will engage upon one of the projections on the disk and carry it forward the proper distance. On the under side of said yoke is arranged a pawl, i', similarly arranged, so as to engage one of said projections and move the disk in the same direction on the return of the piston-rod. The rear of each pawl is beveled, as shown, so that the upper one will slip the projections on the disk while the lower one is acting, and vice versa.

Instead of the rod I, shown in Fig. 5, for rotating the valve, the one shown in Fig. 7 may be used, and is much preferred in practical use on account of its cheapness and simplicity; but when this one is used the crank K' on its end will cause the valve to oscillate instead of revolve. Although either one of the two may be used in practical use I expect to use the one shown in Fig. 7.

Fig. 8 represents another modification of my apparatus for working an oscillating valve, where the valve-rod is provided with a rack, which is actuated by a suitable ratchet.

Having thus described my invention, what I claim is—

1. The rotating or oscillating valve D, in combination with its operating rod, substantially as described.

2. The spring G, operated by the piston, in combination with the adjustable stud G', substantially as set forth.

3. The cylinder A, piston B, valve D, spring G, adjustable stud G', valve-rod I, and disk K, when all are combined to form a water-meter, substantially as described.

4. In combination with the valve D, the spring o stem d', with its shoulder c', and sleeve e, substantially as shown and described.

AUGUSTUS M. DE SOUCHET.

Witnesses:
J. A. LEMCKE,
CHAS. L. COOMBS.